United States Patent
Gillner et al.

[11] Patent Number: 5,445,694
[45] Date of Patent: Aug. 29, 1995

[54] METHOD FOR THE PRODUCTION OF A HEATED COMPOSITE GLASS SHEET WITH METAL WIRES ARRANGED IN THE THERMOPLASTIC INTERMEDIATE LAYER

[75] Inventors: Manfred Gillner; Karl-Heinz Mueller, both of Aachen; Siegfried Pikhard, Roetgen; Juergen Engels, Stolberg; Gerd Sauer, Stolberg-Venwegen; Bernhard Reul; Klaus Henn, both of Aachen, all of Germany; Helmut Maeuser, Simpelveld, Netherlands; Stefan Immerschitt, Herzogenrath; Dieter Neumann, Stolberg, both of Germany

[73] Assignee: Saint-Gobain Vitrage International, Courbevoie, France

[21] Appl. No.: 202,488

[22] Filed: Feb. 28, 1994

[30] Foreign Application Priority Data

Feb. 27, 1993 [DE] Germany ................. 43 06 122.2
May 21, 1993 [DE] Germany ................. 43 16 964.3

[51] Int. Cl.⁶ ............... B32B 31/12; B32B 17/00; H05B 6/40; H05K 3/02
[52] U.S. Cl. ................... 156/106; 156/101; 156/102; 156/155; 156/267; 156/272.8; 156/273.9; 156/274.4; 219/121.4; 219/121.41; 219/121.68; 219/121.69; 219/633; 219/634; 324/505; 324/713
[58] Field of Search ............... 156/99, 101, 106, 155, 156/102, 274.2, 275.1, 267, 250, 251, 257, 272.2, 272.8, 272.4, 273.9, 274.6; 219/68, 203; 264/25; 324/505, 713

[56] References Cited

U.S. PATENT DOCUMENTS

| | | | |
|---|---|---|---|
| 3,119,919 | 1/1964 | Pratt | 219/68 X |
| 3,383,762 | 5/1968 | Leclercq | 219/203 X |
| 3,410,979 | 11/1968 | Larsson | 219/68 X |
| 3,431,384 | 3/1969 | Cooper | 219/68 |
| 3,591,754 | 7/1971 | Baldwin, Jr. | 219/68 X |
| 3,597,578 | 8/1971 | Sullivan et al. | 219/121.67 |
| 3,629,040 | 12/1971 | Hinton et al. | 156/273.9 X |
| 3,729,616 | 4/1973 | Gruss et al. | 219/203 X |
| 3,930,304 | 1/1976 | Keller et al | 437/8 |
| 4,095,078 | 6/1978 | Waenerlund et al. | 219/68 |
| 4,201,905 | 5/1980 | Clark et al. | 219/68 X |
| 4,259,367 | 3/1981 | Dougherty, Jr. | 437/7 |
| 4,321,296 | 3/1982 | Rougier | 219/203 X |
| 4,358,659 | 11/1982 | Spohnheimer | 219/121.62 |
| 4,528,435 | 7/1985 | Billon-Perron et al. | 218/68 X |
| 4,670,639 | 6/1987 | Behn | 219/121.69 |
| 4,705,931 | 11/1987 | DiMino | 219/68 |
| 4,829,163 | 5/1989 | Rausch et al. | 219/203 X |
| 4,916,278 | 4/1990 | Rudd et al. | 219/68 X |
| 4,940,317 | 7/1990 | Reuben | 219/219 X |
| 5,183,985 | 2/1993 | Sidky et al. | 219/645 |
| 5,350,902 | 9/1994 | Fox et al. | 219/633 |

Primary Examiner—Michael W. Ball
Assistant Examiner—Francis J. Lorin
Attorney, Agent, or Firm—Oblon, Spivak, McClelland, Maier & Neustadt

[57] ABSTRACT

An electrically heated composite glass sheet including heating element wires deposited and fixed in place on the thermoplastic film connecting the individual glass sheets together so as to extend from the one film edge as far as the opposite film edge. The heating wires are connected in parallel with buses, which are arranged at a predetermined distance from the edge of the film. Directly adjacent to the buses, the sections of the wires which are arranged between the buses and the edge of the film are severed by moving two electrodes, which are connected with a power supply, into contact with the wires. The electric current heats the wires between the electrodes to their fusion temperature and thereby severs the wires.

14 Claims, 3 Drawing Sheets

METHOD FOR THE PRODUCTION OF A HEATED COMPOSITE GLASS SHEET WITH METAL WIRES ARRANGED IN THE THERMOPLASTIC INTERMEDIATE LAYER

BACKGROUND OF THE INVENTION

1. Field of the Invention

The invention relates to a method for the production of a composite glass sheet made up of at least two individual glass sheets and at least one thermoplastic film connecting the sheets together and with one or more metal wires, the metal wires being deposited and fixed in place on the intermediate layer and the film provided with the wires being joined to the individual glass sheets by the application of heat and pressure.

2. Discussion of the Related Art

Composite glass sheets with wires laid in the thermoplastic intermediate layer are employed in automobiles as electrically heated glass sheet and/or antenna sheets. Further applications of such glass are in the field of construction, in which they are employed, for instance, in heated glazing work, as alarm glazing for the protection of rooms against breaking in or breaking out and for glass screens to prevent the passage of electromagnetic radiation or for decorative purposes.

If the metal wires serve as heating wires, a series of heating wires are generally connected in a parallel circuit with bus conductors arranged along two opposite edges of the glass sheet.

For the deposition and fixing in place of the wires on the thermoplastic film, various methods have been developed. In the case of a parallel arrangement of the wires, the buses are made in the form of thin tapes or ribbons and are fixed in position on the thermoplastic film, which has been cut to the final size. Then in the method which is most frequently employed in practice the wires are spanned out over the thermoplastic film cut to its final size and fixed in place by the application of heat and pressure. After this the wire ends projecting past the film edges are cut off so as to be made flush with the film.

In the case of composite glass sheeting, in which the metal wires are applied in this manner, the embedded wires extend out past the buses as far as the peripheral surface of the composite glass sheet. Because of the fact that after the bonding process there is not always a firm, adhesive connection between the surface of the wires and the material of the thermoplastic film, it is possible for small channels to be produced along the wire ends, which are open towards the peripheral surface. Then in the course of time moisture is able to diffuse inwards, and it may for example cause corrosion on the bus and at the points of contact between the wires and the buses.

SUMMARY OF THE INVENTION

One object of the present invention is to provide an improvement of the above method such that it is possible to prevent undesired effects attributable to wire ends extending as far as the circumferential surface of the composite sheet.

In accordance with the invention, this object is achieved after the deposit and fixing in position of the wires on the thermoplastic film by severing at least a part of the wires within the film area by the local action of heating energy which is only absorbed by the metal wires without impairment to the film, such energy heating the metal wires up to their fusion temperature.

Thus the method in accordance with the invention provides for a severance of the ends, which emerge at the peripheral surface, of the wires fixed in position on the film, by fusing the metal without excessive heating of the thermoplastic film here. Thus while the wire itself is completely removed at this position, the volume of the thermoplastic film is not at all reduced. During the following bonding process at this position the thermoplastic film fills up the space between the two glass sheets without the possibility of diffusion channels being produced or maintained. Therefore, the danger of corrosive action adjacent to the wires or the bus due to moisture diffusing along capillary cavities is prevented.

Since the wire which can be severed in accordance with the invention by causing combustion and/or evaporation of the wire while leaving no undesired deposits, the method of the invention may also be performed successfully not only adjacent to the edge of the sheet but also when desired within the viewing area of the glass sheet which is looked through.

As compared with mechanical severing methods, the method in accordance with the invention also has the advantage that no substantial mechanical forces are exerted on the wires, which could possibly lead to a displacement of the wires on the film.

The method of the invention may also be utilized in the case of antenna windows or panes. In the case of windows with an antenna wire embedded in the thermoplastic intermediate layer or with several antenna wires it may be necessary or expedient to sever the antenna wire or wires (which, because of the mounting process, extend all the way up to the circumferential surface of the composite glass sheet) at a distance from the peripheral surface in order to prevent any possible direct electrical contact via the adhesive composition with the metal window frame. In such cases there is also an interest in limiting the electrical capacitance of the sheet antenna to a desired value.

In accordance with a first aspect of the method of the invention the energy required for severing the wires is introduced in the form of electrical energy into the respective sections of the wire by applying an electrical potential difference at either side of the point at which severance is to take place. The severing of the wires is performed in this manner in accordance with the same principle as that of conventional electrical fuses. Since the material of the thermoplastic film is electrically non-conducting, there is no direct passage of current through the film itself, which is therefore only slightly heated at most.

In accordance with another aspect of the method of the invention the energy required for the fusion of the wires is provided by the action on the wires of laser radiation with a wavelength which is only absorbed by the metal of the wire and not by the material of the thermoplastic film.

In accordance with a further aspect of the invention it is possible, simultaneously with or immediately after the severing procedure, to check the electrical resistance by making contact with the wires on either side of the point of severance of the wire and by using a check circuit. Thus it becomes possible, in a simple fashion and without any substantial expenditure of time and effort, to check whether the severing operation has been successful on all wires and has led to the desired cuts in the wires.

The two operations of severing the wires and monitoring the severing operation may be performed in a single step. In this manner, there is not only a more efficient performance of the method but also the possibility of using the monitoring operation to control the severing operation so that there is a complete cutting of all metal wires at the points where severance is desired.

Should the severance of the wires be performed in two steps with the aid of electrical energy by the introduction of an electric current via two electrodes, it is expedient to monitor the electrical resistance directly using the electrodes responsible for effecting the severance operation. It is also possible to monitor the severance operation by means of electrodes, which are moved up behind or follow the severing electrodes.

The monitoring of the electrical resistance can be performed in various ways by a measurement of the electrical potential differential between the electrodes or by a measurement of the current flowing between these electrodes, in each case in the course of the severance operation itself. The electrical potential differential and the current vary during the severance operation, and as long as the electrodes responsible for performing severance operation are not in electrical contact with the wire to be severed, there is a predetermined electrical potential difference between them, which is maintained by an external power supply. Upon contact of the electrodes with the wire to be severed an electric current will flow through the wire. Due to this current, the voltage between the electrodes will be reduced. When the wire is cut, the current will be interrupted and the potential difference will go back to its original (higher) value. Due to the variation with time of the current or the electrical potential difference it is possible to determine whether or not the wire has been cut.

In accordance with another aspect of the invention, when a non-interrupted wire is found it can be marked as being uncut. For example, this may be performed by the operation of an ink jet nozzle which is used to mark the position of the uncut wire when a resistance measured at this point falls below a predetermined value. Instead of this or in addition thereto, upon detecting an unsevered wire the monitoring operation may involve the production of an optical or acoustic signal or a respective signal may be stored in a counter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
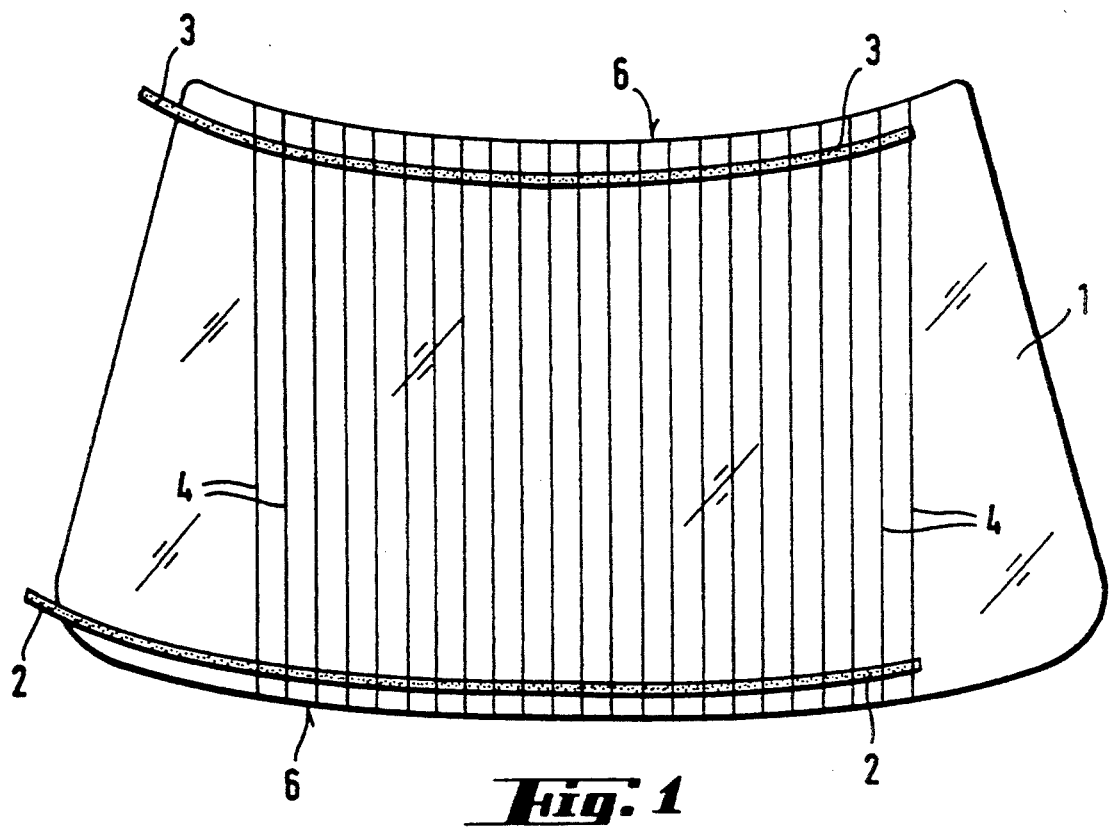
FIG. 1 shows a film for a heated glass sheet provided with buses in an overall view.

Referring now to the drawings, wherein like reference numerals designate identical or corresponding parts throughout the several views, and more particularly to FIG. 1 thereof, the thermoplastic film or foil illustrated in FIG. 1 and cut to its final dimensions is to be processed to produce an electrically heated windscreen. It consists of conventional polyvinylbutyral. On this film 1 a tinned copper film tape 2 is applied along the lower edge whereas along the upper edge parallel thereto a tinned copper film tape 3 is applied. These copper film tapes 2 and 3 serve as buses for the heating elements 4. The heating elements 4 extend respectively transversely across the entire width of the film, i.e., respectively over the buses as far as the cut edges 6 of the film 1 extend. The heating elements 4 preferably consist of thin tungsten wires with a diameter which is 20 to 50 $\mu$m. The heating element 4 can be deposited in a straight or corrugated form on the film and fixed in position.

Figure 2:
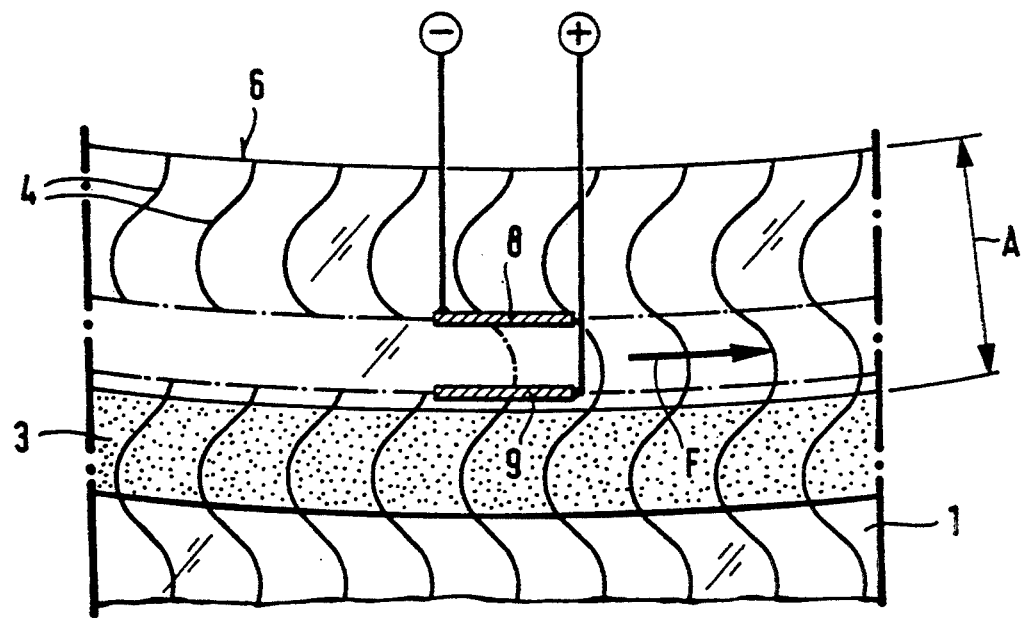
FIG. 2 shows part of the structure in accordance with FIG. 1 in the course of electrical severance of the wire ends.

The distance A between the cut edge 6 of the film 1 and the copper film tapes 2 or 3 is generally between 0.5 and 2 cm. In this region, and in particular directly adjacent to the copper film tape 2 or 3, the severance of the wires 4 is performed in accordance with the invention by contacting the wires 4 using two electrodes 8 and 9 connected with a suitable power supply, as is diagrammatically illustrated in FIG. 2.

In the case of tungsten wire, it has been found to be appropriate to utilize DC current with a potential of 10 to 30 volts. In this respect it is possible to provide a current of 3 to 30 amps.

The two electrodes 8 and 9, which for example may possess the form of runners, are moved in the direction of the arrow F along the copper tape 3 over the film. As soon as both electrodes make contact with a wire 4, the section of the wire between the electrodes will fuse, burn or evaporate immediately so that the wire is neatly and effectively severed.

Figure 3:
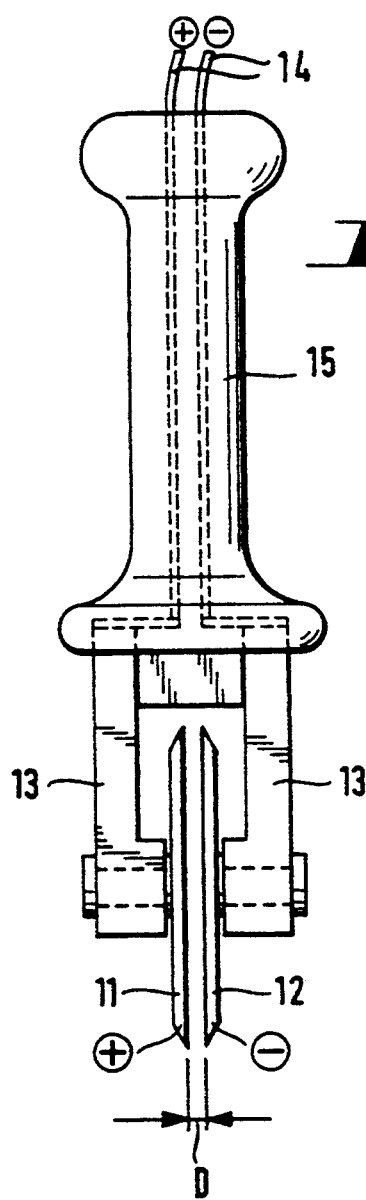
FIG. 3 shows a tool suitable for electrical severance.

It is convenient if the electrodes are designed in the form of rotary disks or wheels and are mounted on a common holder. Such a tool is depicted in FIG. 3. It comprises the two circular disks 11 and 12, which are rotatably mounted on the holding means 13. The two disks 11 and 12 are insulated electrically from each other and connected to a power supply via a cable 14. The distance D between the disks can be 2 to 3 mm, for example. The tool is provided with a handle 15 by means of which it can be driven along the copper film tape 3 over the film 1 manually or with the aid of a robot.

Figure 4:
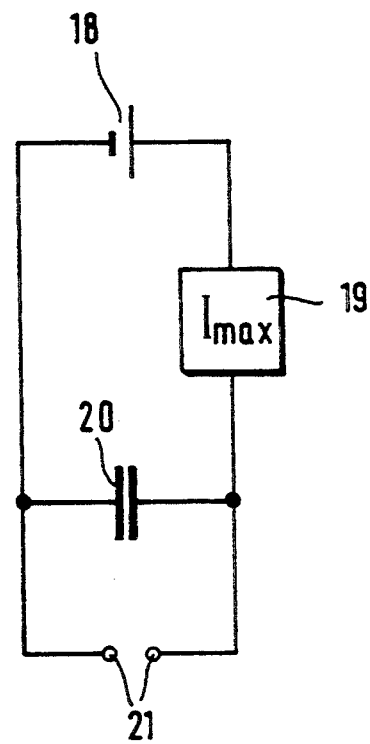
FIG. 4 depicts an electric circuit for the production of the severance circuit.

FIG. 4 shows an electric circuit which has proved successful for the production of the required severance current. It comprises a DC power supply 18 delivering a potential difference on the order of 10 to 30 V, a current limiting circuit 19 and a capacitor 20. The current limiting circuit 19 is set for a tungsten wire 20 to 50 $\mu$m in diameter, a clearance between the severance electrodes of 1 to 3 mm and a current of 3 to 5 amps. The capacitor 20, which serves as an energy storage means, has a capacitance of more than 1000 $\mu$F. The severance electrodes or, respectively, the cable 15 of the severance tool illustrated in FIG. 3 are connected with the output 21 of the power supply circuit.

Figure 5:
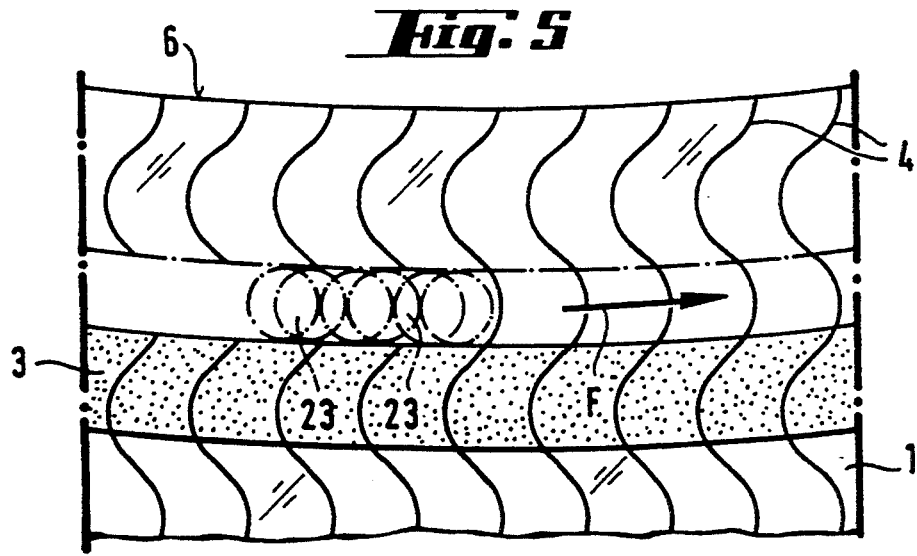
FIG. 5 is a view of part of the arrangement as illustrated in FIG. 1 during severance with the aid of laser radiation.

FIG. 5 indicates one working embodiment of the invention, in the case of which the energy necessary for severance of the wires 4 is supplied by the action of laser radiation with a wavelength under 2.5 μm. Preferably a Nd:YAG laser is employed with an emission wavelength of 1.06 μm. The laser beam is moved with the aid of a suitable device, such as a CNC cross slide, on the outside of the copper film tape 3 in the direction of the arrow F, the speed of motion of the laser and the power thereof being matched so that the metal wires 4 fuse without the thermoplastic film 1 being substantially heated. Preferably a pulsed laser is utilized so that the speed of movement of the laser is selected as a function of the pulse frequency and the cut surfaces 23 of the individual pulses overlap as shown in the drawings.

The laser beam may be employed otherwise than for performing the severance of the wires 4. For example, it may be employed to ensure that there is an electrical connection between the wires 4 and the buses by moving the laser beam partly over the tinned film tapes 3 as well so that the tin is fused and the electrical contact with the wires is improved. Preferably in this case the operation is such that prior to the treatment with the laser beam a further tinned copper film tape 3 is mounted thereon. Due to the heating of the wires 4 with the laser radiation the mutually adjacent tin layers of the two copper film tapes fuse together and thereby enclose the wires lying in this plane in an airtight manner.

Figure 6:
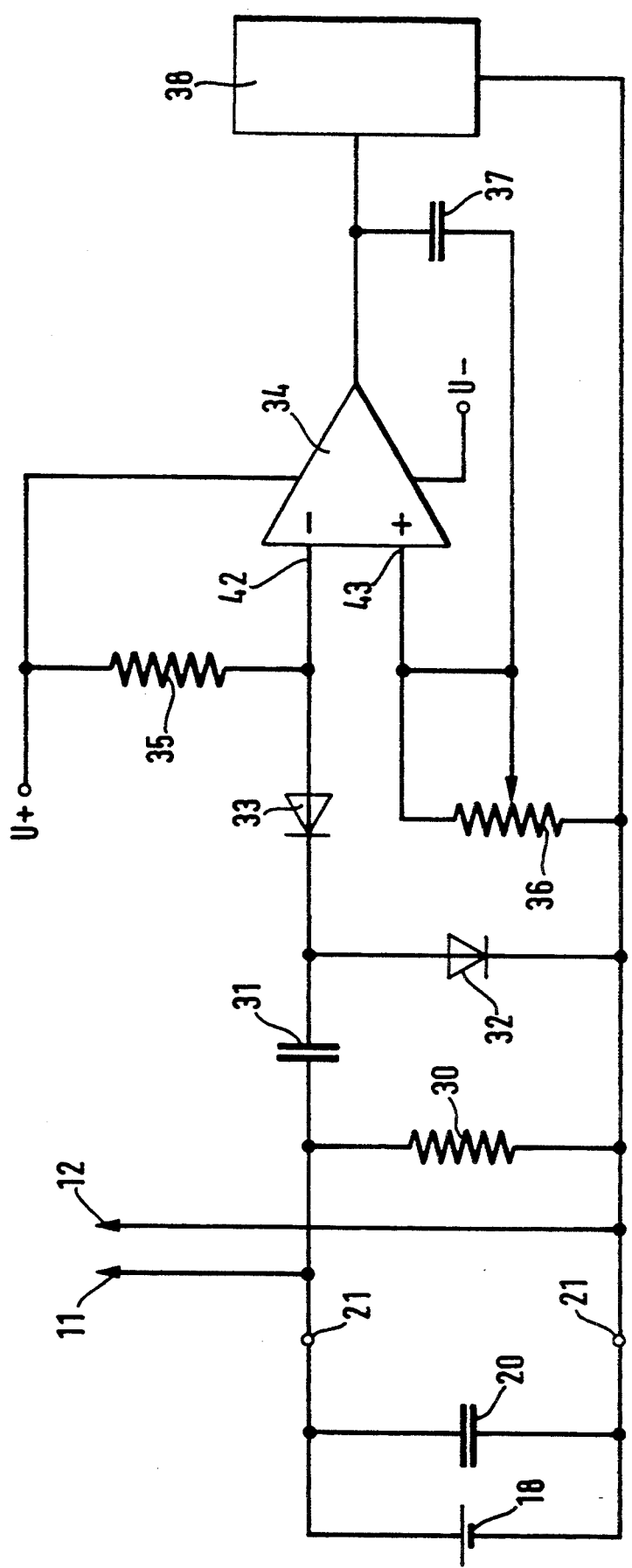
FIG. 6 shows an electric circuit for monitoring the severance operation.

FIG. 6 shows an electric circuit with which it is simultaneously possible to perform the severance operation with simultaneous monitoring of the electrical resistance across the point of severance. The circuit comprises resistors 30, 35 and 36, capacitors 31 and 37, diodes 32 and 33, an operational amplifier 34 and a marking device 38. At points indicated at 11 and 12 the circuit is connected by two electrodes, which are moved along the wires to be monitored or checked.

The circuit is connected at the outputs 21 with the power producing circuit comprising a power supply 18 and a capacitor 20 connected in parallel to it. In parallel with the actual detector circuit there is a resistor 30, whose resistance value is small enough to render possible the flow of a sufficiently great electric current therethrough so that even in the case of a short modification in the voltage applied it is possible to prevent any excessive current through the electronic circuit. When the electrodes 11 and 12 are not in electrical contact with one another, then there will be the maximum voltage between them, which is set by the power supply circuit 18 and 20. Then as long as the current applied is constant, no current will be flowing through the capacitor 31. As soon as the electrodes 11 and 12 are connected by the wire to be monitored, the voltage between them will abruptly drop. Accordingly, the capacitor 31 will discharge through the diode 33 and the operational amplifier 34 will therefore be activated via its inverting input 42. The output signal of the operational amplifier 34 will operate the marking device 38 which will mark the wire which has not been severed by the action of the capacitor 37 and the resistor 36 the operational amplifier will have the output signal fed back to its non-inverting input 43. Until the capacitor 37 is discharged, there is therefore a change electrical potential at the non-inverting input 43 of the operational amplifier 34 with the result that the operational amplifier 34 will not be activated even if a change occurs in the signal at the inverting input 42 during the discharge time of the capacitor 37. Accordingly, it is possible to prevent any following interfering pulses from being registered as further wires which have not been severed.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for the production of a composite glass sheet, comprising the steps of:
   forming a first glass sheet;
   forming a thermoplastic film;
   depositing and fixing one or more metal wires on said thermoplastic film;
   severing a portion of said one or more metal wires on the film by applying energy to said one or more metal wires which is only absorbed by the metal wires without damage to said thermoplastic film, said energy heating said metal wires to a fusion temperature of the metal of the wires;
   placing said thermoplastic film on said first glass sheet with the application of heat and pressure; and
   placing a second glass sheet on said thermoplastic film with the application of heat and pressure.

2. The method according to claim 1, wherein said step of severing comprises:
   heating said wires with electrical energy by the application of an electrical potential difference on opposite sides of a line of severance at which the wires are to be severed.

3. The method according to claim 2, wherein said step of severing further comprises:
   moving first and second electrodes, connected to a power supply, along said line of severance to sever said one or more metal wires.

4. The method according to claim 3, wherein said first and second electrodes are first and second circular disks arranged with a space therebetween and being rotatably mounted.

5. The method according to claim 2, wherein said electrical energy is produced by a DC power supply circuit which includes a current limiting circuit and a capacitor for energy storage.

6. The method according to claim 1, wherein said energy is in the form of laser radiation with a wavelength less than 2.6 μm.

7. The method according to claim 6, wherein said laser radiation is in the form of pulses from a laser having a speed of movement which is selected as a function of the pulse frequency of the laser such that cut surfaces of the parts irradiated by said pulses overlap each other.

8. The method according to claim 6 or 7, wherein said metal wires are severed along buses consisting of tinned metal film tapes and said laser radiation is caused to partly pass by said buses so that contact between said metal film tapes and said wires is enhanced due to fusion of the tine in said metal film tapes.

9. The method according to one of claims 3–4, further comprising:
   monitoring the electrical resistance of said wires using a monitoring circuit connected across said wires on either side of said line of severance, said monitoring occurring simultaneously with or immediately after said step of severing.

10. The method according to claim 9, wherein said step of monitoring comprises:
    monitoring said electrical resistance directly across said electrodes.

11. The method according to claim 9, further comprising:
  marking at least one of said wires as being unsevered if said monitored electrical resistance falls below a predetermined value.

12. The method according to claim 9, further comprising:
  producing an optical or acoustical signal if said electrical resistance falls below a predetermined value.

13. The method according to claim 12, further comprising:
  storing said produced signal in a counter.

14. The method according to claim 9, further comprising:
  connecting an electronic circuit to said first and second electrodes, said electronic circuit comprising a first resistor, connected in parallel with said first and second electrodes, an operational amplifier with first and second inputs, said first input of the operational amplifier receiving a signal output from said first and second electrodes through a first capacitor and said second input of the operational amplifier receiving a signal output by said operational amplifier through a second capacitor and a second resistor and said signal output by the operational amplifier being used to drive a storage or marking device.

* * * * *